United States Patent
Jamieson et al.

(10) Patent No.: US 7,680,073 B2
(45) Date of Patent: Mar. 16, 2010

(54) MESSAGE ROUTING IN A RADIO NETWORK

(75) Inventors: Philip A. Jamieson, Dorking (GB); Ian A. Marsden, Redhill (GB); Philip A. Rudland, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1506 days.

(21) Appl. No.: 10/515,110

(22) PCT Filed: May 22, 2003

(86) PCT No.: PCT/IB03/02204

§ 371 (c)(1),
(2), (4) Date: Nov. 24, 2004

(87) PCT Pub. No.: WO03/103222

PCT Pub. Date: Dec. 11, 2003

(65) Prior Publication Data

US 2005/0221752 A1 Oct. 6, 2005

(30) Foreign Application Priority Data

May 31, 2002 (GB) .................................. 0212579.7
Jan. 14, 2003 (GB) .................................. 0300780.4

(51) Int. Cl.
H04W 4/00 (2006.01)
(52) U.S. Cl. ........................ 370/328; 455/41.2; 709/238
(58) Field of Classification Search ................. 375/133; 455/507, 517; 370/389, 392
See application file for complete search history.

(56) References Cited

U.S. PATENT DOCUMENTS

| 6,690,657 | B1 * | 2/2004 | Lau et al. ..................... 370/315 |
| 6,745,038 | B2 * | 6/2004 | Callaway et al. ......... 455/456.1 |
| 6,754,250 | B2 * | 6/2004 | Haartsen ...................... 375/132 |
| 6,920,171 | B2 * | 7/2005 | Souissi et al. ............... 375/133 |
| 6,957,086 | B2 * | 10/2005 | Bahl et al. .................. 455/557 |
| 2001/0002912 | A1 | 6/2001 | Tony et al. |
| 2002/0039357 | A1 | 4/2002 | Lipasti et al. |
| 2002/0137462 | A1 * | 9/2002 | Rankin ........................ 455/41 |
| 2002/0176388 | A1 * | 11/2002 | Rankin et al. ............... 370/338 |
| 2003/0069989 | A1 * | 4/2003 | Silvester ..................... 709/238 |

FOREIGN PATENT DOCUMENTS

| WO | 0128156 A2 | 4/2001 |
| WO | 0128157 A2 | 4/2001 |
| WO | 0169869 A2 | 9/2001 |
| WO | 0201735 A2 | 1/2002 |

* cited by examiner

Primary Examiner—Chirag G Shah
Assistant Examiner—Otis L Thompson, Jr.

(57) ABSTRACT

A method for routing messages having a routing indicator across linked master/slave configured piconets. At each master node, a routing table is stored and at each hop a receiving master node performs a reception algorithm on the routing indicator, the result enabling the receiving node to identify a target node and whether that node is local to the receiving piconet or a node accessible through a piconet with which the receiving piconet is linked. In the latter instance, the receiving node performs a transmission rule on the result to generate a new routing indicator replacing the routing indicator, which is then transmitted with the message to the identified piconet.

13 Claims, 5 Drawing Sheets

Table 62:

| REF | ADDR | CNT |
|---|---|---|
| 0 | M1 | - |
| 1 | S11 | - |
| 2 | S12 | - |
| 3 | S13 | - |
| 4 | M2 | 6 |

Rows 0–3: 63; Row 4: 65

Table 64:

| REF | ADDR | CNT |
|---|---|---|
| 0 | M2 | - |
| 1 | S21 | - |
| 2 | S22 | - |
| 3 | M1 | 4 |
| 7 | M3 | 3 |

Rows 0–2: 63; Rows 3,7: 65

Table 66:

| REF | ADDR | CNT |
|---|---|---|
| 0 | M3 | - |
| 1 | S31 | - |
| 2 | S32 | - |
| 3 | M2 | 7 |

Rows 0–2: 63; Row 3: 65

FIG.5

```
IF RI < ref(SRC ADDR) THEN
    LR = RI
        ELSE
IF RI < [TOTAL- CNT(SRC ADDR)] THEN
    LR = RI + CNT(SRC ADDR)
        ELSE
        LR = RI - [TOTAL - CNT(SRC ADDR)] + ref(SRC ADDR)
```

```
IF LR < ref(TN) THEN
    RI = LR + CNT(TN)
        ELSE
IF LR < ref(TN) + CNT(TN) THEN
    RI = LR + ref(TN)
        ELSE
        RI = LR
```

MESSAGE ROUTING IN A RADIO NETWORK

TECHNICAL FIELD

This invention relates to methods for routing a message in a network comprising a plurality of linked radio master/slave configured piconets, and further relates to piconet master devices suitable for practising said methods.

BACKGROUND

Short range radio networks having a master radio device which subsequently registers or associates slave radio devices with itself to form a master/slave piconet are generating much interest. The interoperability of such master/slave devices (or network nodes) depends on each device having a predetermined and standardised radio protocol, such as those defined in the 802 family of radio standards adopted by the IEEE. A well-known example of such a protocol is the Bluetooth™ protocol. Another protocol in development at the time of this patent application is that being developed by the ZigBee Alliance group of companies (www.zigbee.org). The main aims of the ZigBee Alliance are to define a protocol and radio stack suitable for low data rate, low power applications such that radio devices incorporating the ZigBee standard are of low cost and interoperable. It is hoped that such low cost self-configuring radio device piconets will open up many home consumer and industrial control markets, for example in heating and lighting applications. The ZigBee alliance group of companies are aiming to produce radio devices with a target cost of less than $2 at the time of writing, with such devices having relatively simple microcontrollers acting as a microprocessor and a limited amount of on-board memory available.

However, a ZigBee radio piconet comprising a master node and associated slave nodes has, at the time of making this application, limited radio coverage related directly to the radio broadcast range of the master node which is estimated to be in the region of a few tens of meters for a ZigBee piconet communicating in one of the 16 channels defined in the 2.4 GHz ISM band. Another shortcoming exists in that no scheme for routing messages from one ZigBee piconet to another has been defined, and known ad-hoc mobile network routing methodologies typically require significant resource capabilities to be available in each node, to store for example forwarding/route information which must be inserted into a message en route, such information identifying intermediary and destination node addresses (each address being typically a unique six or eight byte number).

It is therefore an object of the present invention to mitigate the above shortcomings.

SUMMARY

According to a first aspect of the present invention there is provided a method for routing a message in a radio network having a plurality of master/slave configured piconets, each piconet having a master node linked to, and operable to communicate with, the master node of another piconet and wherein each linked master node stores a routing table comprising local piconet entries identifying any slave nodes associated with its piconet and linked piconet entries identifying those piconets with which it is directly linked, the method comprising a master node of a piconet:

receiving a message from a linked master node, the message including a routing indicator;

calculating a local reference from the indicator according to a reception rule;

identifying a target node according to the local reference and routing table information; and either if the target node is identified as being a slave node associated with the local piconet transmitting the message to that slave node; or if the target node is identified as being a node accessible via a linked piconet, calculating a new routing indicator according to a transmission rule, replacing the routing indicator in the message with the new routing indicator and transmitting the message to the master node of the linked piconet.

Applicants have devised a method suitable for routing messages across several piconets linked together via their master nodes, and wherein messages having routing indicators are routed across said links according to simple stored rules and in conjunction with routing table information stored by the master nodes only. The routing table information comprises limited information about those piconets with which the master is directly linked and by applying the steps of the method the master node can identify which linked master to forward the message to should it need forwarding.

Advantageously, each linked piconet entry in a routing table comprises a reference associated with the address of a master node of that linked piconet and a count of the total number of nodes accessible via that master node. Hence, the count indicates the total number of nodes accessible through that linked piconets master node, including the nodes of any other piconets to which the linked piconet is itself linked. Ordering these entries consistently and ensuring that there are no loops in the network topography created by the links enables master nodes to store very compact routing tables by which, together with the rules (which themselves depend on the ordering of the table entries), messages are routed efficiently.

In a network according to the above master nodes are provided with processing, transceiver and memory which co-operate to perform the steps of the method for routing messages as described according to simple rules and compact stored routing tables.

Preferably, communication between master nodes and slave nodes within the piconets of the network is arranged according to a predefined short range radio protocol as defined by the ZigBee Alliance. The links between master nodes may be achieved by simple cables or power lines directly connecting the master nodes, or the links may be achieved via radio or infrared hardware. If the piconets are linked by radio links then it is advantageous to use the transceiver and ZigBee protocols already provided in the nodes and operate communication within the local piconet and communication from one piconet to another across the piconet links on a different radio channel to minimise radio interference.

BRIEF DESCRIPTION OF THE DRAWINGS

The invention will now be described, by way of example, with reference to the accompanying drawings wherein.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments.

Figure 1:
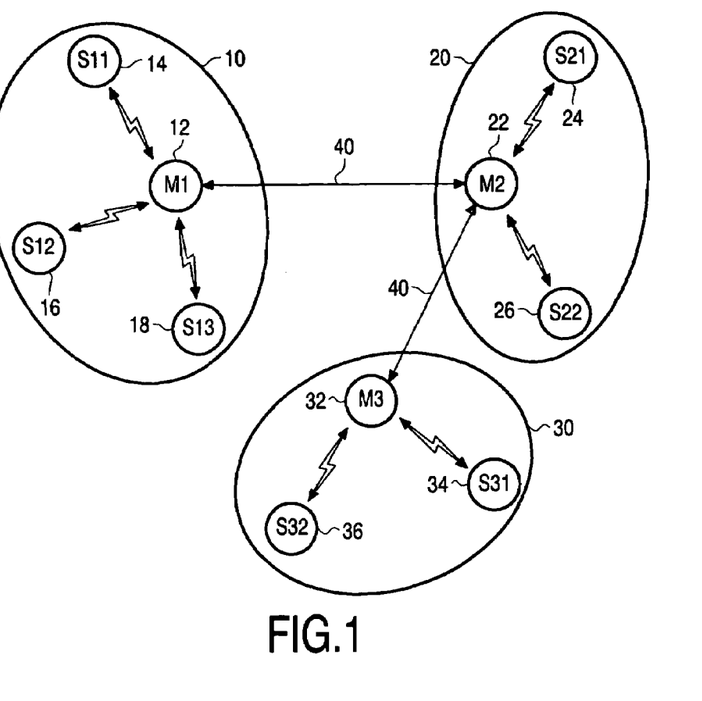
FIG. 1 shows a diagram of a network comprising linked piconets.

FIG. 1 shows an example of a network comprising linked piconets 10, 20, 30. Each piconet comprises a radio device or module configured as a master node of that piconet with the master node acting as a central co-ordinator for its piconet. In piconet 10 the master node comprises a master radio device having a unique identifier M1. The master node allows other radio devices to register with and thereby become associated with its piconet as slave devices, with the master node storing information concerning associated slaves and, in one mode of operation co-ordinating communication within the piconet by issuing a periodic reference signal (radio beacons) containing messages with identifiers for its local slave devices.

In the diagram master node M1 has three associated slave devices 14, 16, 18 with identifiers S11, S12 and S13 respectively. Hence the master 12 co-ordinates communication between its associated slaves 14, 16, 18. Such piconets are often called by those skilled in the art master/slave piconets or star networks or sometimes referred to as being a network having a star or master/slave topology. The master node of piconet 10 has a finite radio broadcast range. The master node is usually mains powered (and sometimes referred to as a "full function device" whilst slave devices (sometimes referred to as "reduced function devices") may be battery powered and be programmed with various power saving radio schemes incorporating sleep and wake-up modes. The ZigBee alliance seeks to standardise such radio modules for low data rate and low power applications such as lighting and heating, or control around the home with the piconet operating in one of, for example 16 predefined channels in the 2.4 GHz ISM band, and according to a direct sequence spread spectrum scheme and a carrier sense multiple access protocol (CSMA). Piconet communications in a master slave piconet are usually synchronised by the network master radio beacons (which contain a network identifier, for example the identifier of the master). For the sake of illustration, in an application the slave radio devices 14, 16 and 18 may be incorporated in light switches and lamps, with one slave device being logically "paired" with another such that operation of the switch causes a radio signal comprising data packets to be transmitted to the master device, which looks up the identifier for the paired device (or endpoint as it is sometimes called) and transmits an appropriate message to the paired lamp causing the lamp to switch on or off. The configuration (registration/association and logical pairing) of such master/slave piconets is described in more detail in Applicants co-pending patent applications WO0128156 and WO0128157 both published 19$^{th}$ Apr. 2001 and to which the reader is now directed and the disclosure of which is incorporated herein by reference.

FIG. 1 also shows two other piconets 20 and 30 having their own respective master and associated slave devices. Piconet 20 comprises master node 22 (having a unique identifier M2) co-ordinating slave nodes 24 (S21) and 26 (S22). Piconet 30 comprises a master node 32 (M3) co-ordinating two associated slave devices 34 (S31) and 36 (S32). In a large building this situation may occur often, with a first piconet being installed and then several others being installed at a later date. For example the radio devices of piconet 10 may be employed in security products (e.g. window/door sensors) with a second 20 and third piconet 30 installed later to increase security. The individual piconets in FIG. 1 are shown as being linked so that messages may be routed from the co-ordinating node of one piconet to another by a method embodying the present invention.

The piconet 10 of M1 has been linked to the piconet 20 of M2 by link 40, and when the piconet of M3 was installed it in turn was linked to the piconet of M2. These direct links may be via wired or wireless radio or optical means, and may even be virtual in the sense that another intermediary network (for example a local LAN or the internet—not shown in the diagram) may be used.

In the following preferred embodiment it is assumed that the links between masters are provided using the same radio protocol and hardware as used by each master in its piconet. However, those skilled in the art will appreciate that the actual physical embodiment of the "link" may comprise other well known communication means such as optical infrared communication, or powerline signal transmission, or direct cabling. Of importance is that the link carries a particular form of message from piconet to piconet, as will be described shortly.

An additional consideration exists when considering the network topology and in particular the existence of loops or rings. It is often recognised that loop and ring topologies should be avoided (to prevent messages becoming "trapped" in endless circular routes) and the system described is no exception to this. A simple method of ensuring that linked masters do not themselves form a loop in the network topology involves a master device, in receiving a request from another master device supplying an identity and requesting to establish a direct link, first checking with other linked devices for the identity of the requesting device and only establishing a link if the identity of the requesting device is not found. With reference to FIG. 1, and assuming the master nodes of the piconets 10, 20, 30 are all within each others radio coverage area (not shown in the Figure), and links 40 are established as shown between M1-M2 and M2-M3. Consider M3 issuing a request to link with M1. Before granting the link M1 would transmit a request to its directly linked nodes (M2) enquiring if M3 is known. M2 responds with an affirmative acknowledgement and therefore M1 denies the link request from M3. If M2 was itself linked to a further master device, then the enquiry should be transmitted to that master device, which must return the result to M1 via M2 and so on.

A preferred embodiment of the master node device components, program code, routing tables and message format which enable the radio piconets as illustrated in FIG. 1 to route messages according to an aspect of the invention will now be described, wherein the piconets operate according to a ZigBee radio standard.

Figure 2:
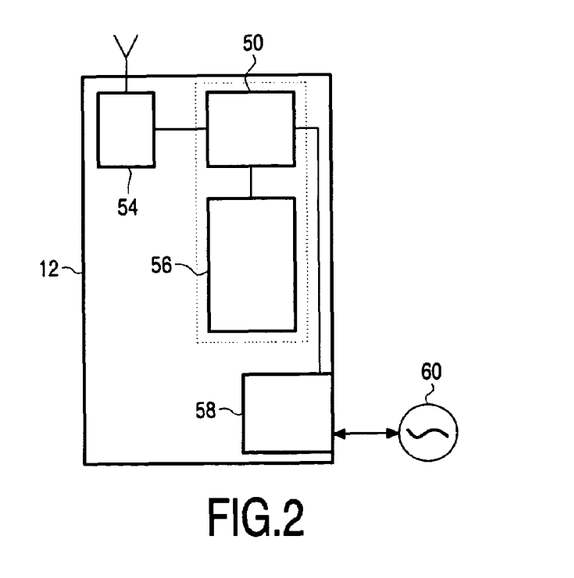
FIG. 2 is a block diagram of a master node radio device made in accordance with the present invention.

FIG. 2 is a block diagram of a master radio device 12 suitable for implementing and co-ordinating a piconet 10 and for operating message routing across linked piconets. The device has power supply means 60 for powering processing means in the form of a microprocessor 50 (or microcontroller) coupled to a radio transceiver 54 for transmitting and receiving radio messages. The processor is also coupled to memory means 56 which stores operating code and piconet information relating to associated slave devices (e.g. identifiers, paired endpoint data and slave service capabilities). The memory comprising ROM (or EEPROM) and RAM is shown as being separate to the processor in the Figure, but may be integrated (represented by the dotted line) with the processor according to cost and chip design considerations.

In this embodiment the transceiver 54 preferably acts as the linking means between masters, with master-master transmission/reception occurring on a different frequency channel to that used by a master servicing associated slave devices within its piconet. Note that a master device may also comprise optional linking means 58 for linking the master node to another master node as will be described in later embodiments.

Figure 3:
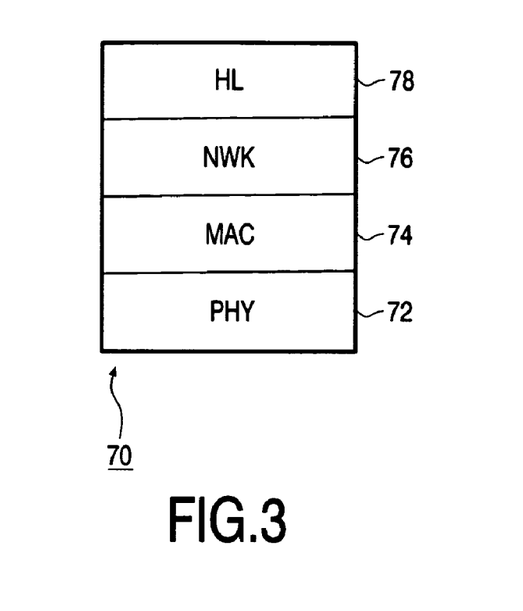
FIG. 3 represents a radio stack used by a master node.

The processing means operates the piconet according to a predefined ZigBee radio stack and protocol as shown in FIG. 3. This stack 70 is provided in a ROM portion of memory 56 and consists of lower Physical (PHY) 72 and Medium access control (MAC) 74 layers through which a received radio message is passed sequentially to the network layer (NWK) 76. This layer interfaces with the higher layers 78 which themselves include application code (for example a lighting application if the node is to be incorporated in a lamp). Program instructions which, when executed by the processor 50 cause the steps of a method embodying the present invention to be carried out are preferably implemented as part of the NWK layer.

Figure 4:
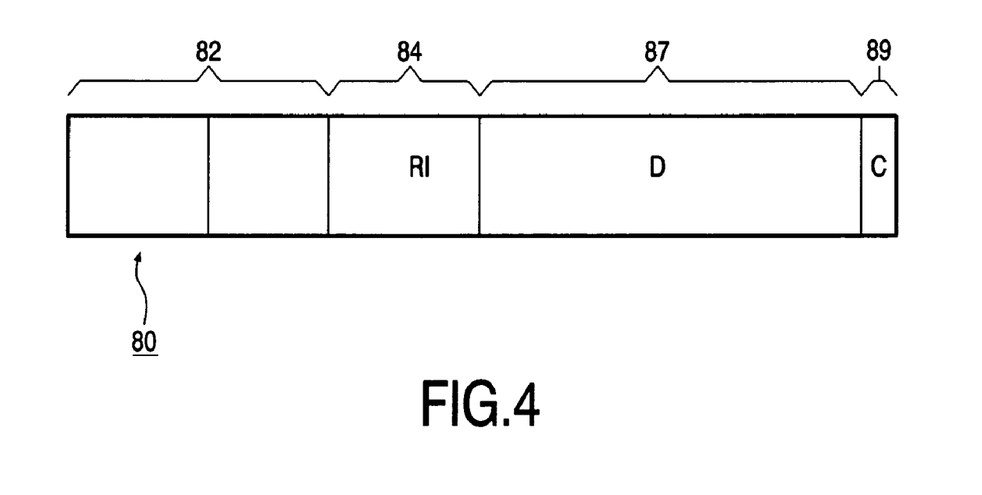
FIG. 4 illustrates a radio message (packet) having a route identifier field for use with a method of the present invention.

FIG. 4 is an example of the structure of a header/payload data packet or message 80. The message has various fields 82 having header information comprising a senders unique identifier (typically an 8-byte unique number indicating device manufacturer and the device sending the radio data packet) for example and a field 84 where, in this preferred embodiment a two-byte routing indicator (RI) is inserted or modified as will be described shortly. Message data 87 and checksum fields 89 are also defined. As well known to those skilled in the art of packet radio systems, portions of the message (service and protocol data units SDU, PDU) are operated on, and of relevance to, the various layers defined in the radio standard. The NWK layer of the present invention, in receiving a message from the MAC layer would operate on header data comprising the address of the sender of the message and the RI data field 84, together with data stored in a routing table by the master device 12.

Figure 5:
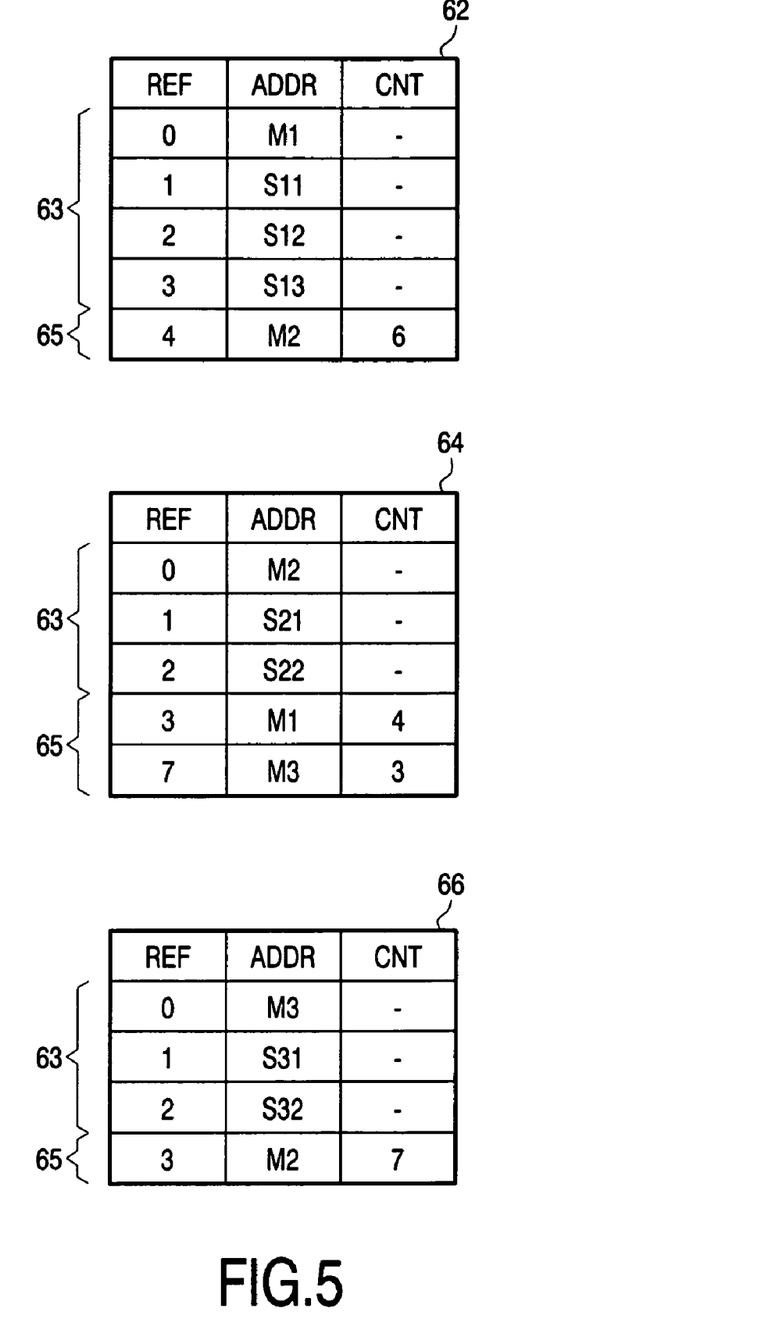
FIG. 5 illustrates example routing tables for use with a method of the present invention, FIG. 6 lists example pseudo-code for a reception rule according to the invention, FIG. 7 lists example pseudo-code for a transmission rule according to the invention.

FIG. 5 illustrates examples of the routing tables configured and stored by respective master nodes 12, 32, 42 in memory 56 which the NWK layer operates on to route a message 80. The master device builds a routing table 62 comprising local piconet entries 63 having a reference (REF) and address (ADDR) for associated slaves, and linked piconet entries 65 for those master nodes with which it is linked. The table 62 corresponds to the routing table stored by master M1 of the network shown in FIG. 1, and table 64 corresponds to that stored by M2, and table 66 that of M3. The linked piconet entries 65 are referenced below the local piconet entries and comprise the address of a directly linked master node and a total of the count (CNT) of devices/nodes accessible through that link. For example, when piconet 10 is first installed table 62 would only comprise local references of associated devices within that piconet. At a later date M2 is linked to M1, and M1 would update its routing table with a REF of 4, an identifier address 'M2' and a count which at that time would comprise only the devices of the piconet of M2 (i.e. 3).

Some time later piconet M3 is linked to M2, and M2 adds an entry for M3 with a reference calculated from the previous reference (REF) entry and associated count (i.e. REF of 3 plus CNT 4 gives an entry in the REF column of 7 for M2 table 64). M2 then informs any previously linked piconets (i.e. M1) that a new piconet (that of M3) has been linked to it having 3 nodes. M1 therefore updates the count entry for M2 to 6 (this representing the count of devices accessible via M2). In a similar fashion M3 is informed by M2 that it is linked to another piconet (M1) having 4 nodes, and so M3 updates its table 66 entry relating to the count (CNT) of M2 to 3+4=7.

The data in these tables is used by a master, in conjunction with reception and transmission rules (algorithms) to calculate a Routing Indicator which is subsequently utilised to route messages from a source node to a destination node. A receiving master performs the reception rule, identifies from the result of this a target node, inserts a new routing indicator calculated according to the transmission rule if the target node is a master of another piconet and transmits the message to that target node.

Figure 6:
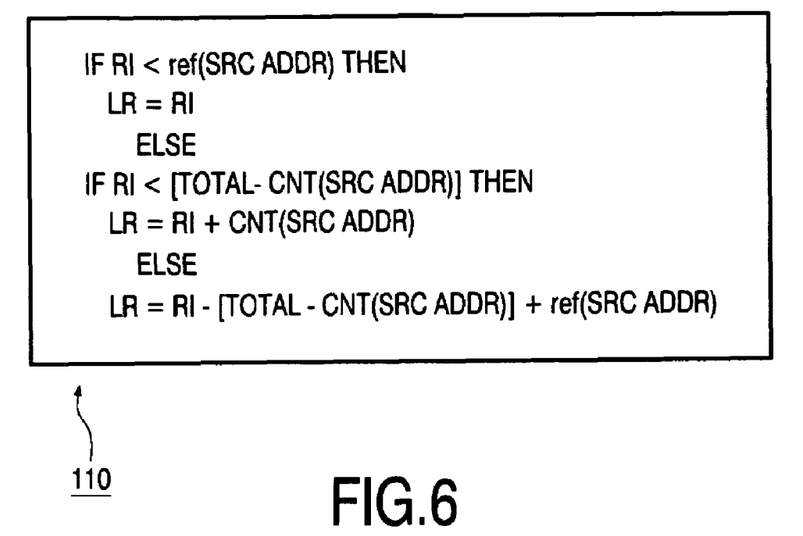
Figure 7:
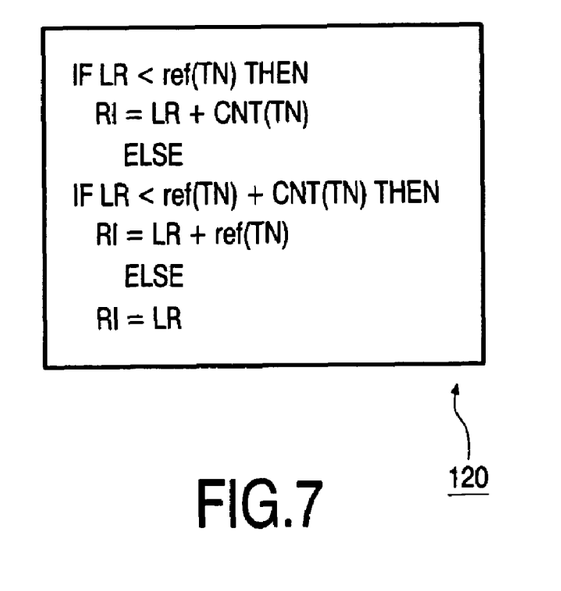

FIG. 6 illustrates example pseudo-code of the operations involved in the reception rule 110, and FIG. 7 illustrates corresponding pseudo-code 120 for the transmission rule. In the code shown in FIG. 6, RI is a routing indicator, ref(SRC) is the reference in the routing table identifying the linked master device that has transmitted the message to the receiving master operating the reception rule, TOTAL is the sum of the devices in the network (which is calculated by a master by summing up entries in the count table and adding this to the number of associated devices within its piconet) and LR is a local reference which is the result of the calculation. FIG. 7 illustrates example pseudo-code of the operations involved in the transmission rule where ref(TN) is the reference of the identified target node in the routing table of the master performing the transmission rule, CNT(TN) is the count associated with that target node and LR is a reference calculated from the reception rule and used by the transmission algorithm to calculate a new routing indicator.

For the sake of completeness, a discovery process is now described wherein a master enquires for a routing indicator for a specific device so that this can be used in future transmissions. In FIG. 1 suppose device S11 requires a pairing with device S21 (for example S11 may be a lighting control unit and the user wishes to pair a lamp S21 which he has installed under the control of M2). S1 issues a request to its master M1 requiring an endpoint creation with S21. M1 examines its routing table 62 and finds no entry for S21, so issues a find request to its linked master M2. M2 receives the request, examines its table and discovers that device S21 is associated with it and has a local reference of 1. M2 now applies the transmission rule to this reference to generate a routing indicator RI of 5 which is returned to the master M1. M1 receives the reference of RI=5 for S21 and applies the reception rule which in this instance yields a resulting reference of 5. M1 caches this result and associates it as an initial reference for routing messages to address S21 for future transmissions and stores endpoint data which pairs the device S11 with the cached reference.

Figure 8:
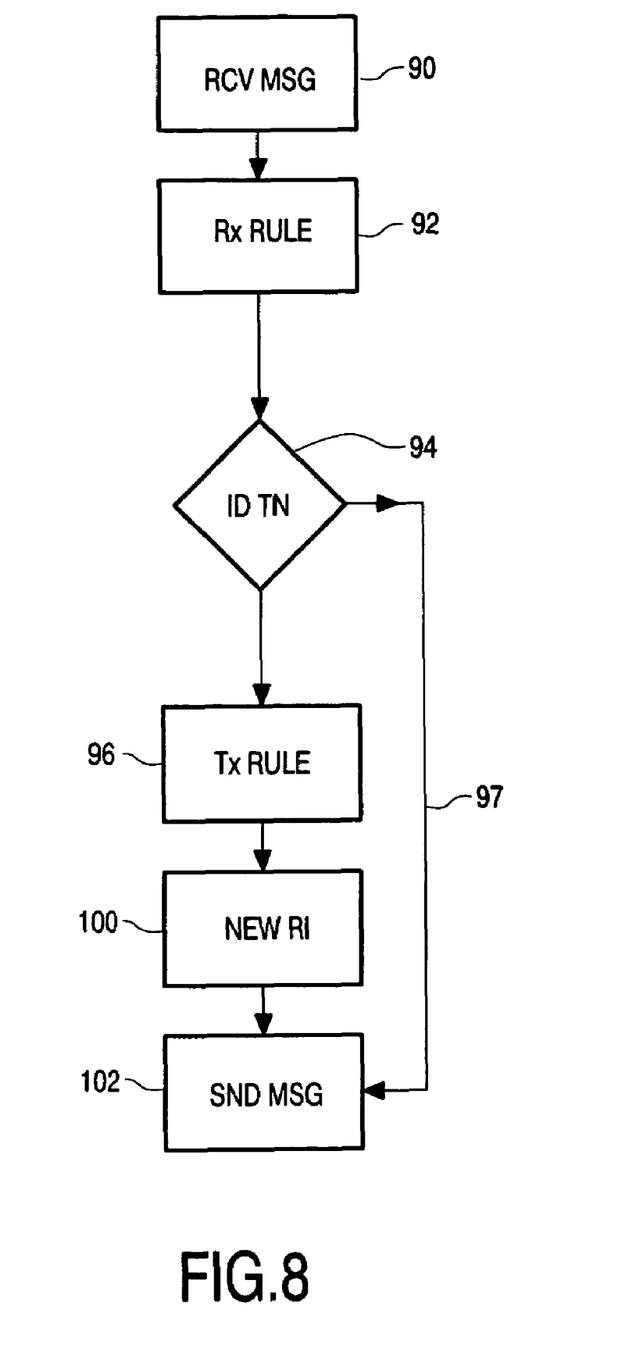
FIG. 8 is a flow chart illustrating exemplary steps for a method according to the invention.

The receiving master M1 now routes messages according to the general method illustrated in the flowchart of FIG. 8 where a message is received (step 90) having a routing indicator, the reception rule 110 is applied (step 92), a target node is identified from the result of the reception rule calculation (step 94) and if the target node is identified as being accessible via a directly linked piconet then the transmission rule 120 is applied (step 96) to generate a new routing indicator (step 100) which is inserted into field 84 of the message 100 and the message transmitted (step 102), else at step 94 if the target node is identified as being an associated member of the receiving master piconet (i.e. the result of the reception rule gives a local reference LR which falls within the local entries 63 of the routing table) then the processor of the master is directed via path 97 to step 102 where the message (step 102) is transmitted to that local node.

Of course, a routing indicator is required to be calculated by the first master in a multi-hop path (e.g. S11-M1-M2-S21), with the method of FIG. 8 then being operated by each receiving master node en route.

For example, in receiving a radio message from S11, M1 retrieves the reference it cached previously from the discovery process and identifies a target node from the reference value and the routing table information. The reference 5 is not stored in the table 62 but 5 lies between the reference for M2 which is 4 and a reference corresponding to M2 plus its count of accessible devices (4+6=10). It will be appreciated that although trivial for this example, in a network having many linked master nodes and routing tables with associated count entries, the reference (previously calculated in a discovery process) usefully identifies which linked master to forward the message to. Inspection of the routing table stored by M2 reveals that references in the range 3 to 6 correspond to nodes reachable by M1 whereas references in the range 7 to 10 correspond to nodes reachable by master M2. Hence the count plus reference data generally identify a target node for forwarding.

Reverting to the multi-hop path example, Master M1, having identified M2 as the target node then performs the transmission rule on the reference 5, giving a routing indicator RI of 1. This is inserted into the message 80 and transmitted to the identified target node M2. M2 now applies the steps of the flowchart illustrated in FIG. 8. M2 on receiving the message (step 90) performs the reception rule (step 92) to give a LR of 1. By comparing this reference with its stored routing table M2 identifies (step 94) that the target node corresponding to this reference is a local associated device (step 95) and therefore it transmits the message to that device which is S21.

For more expansive networks comprising many linked masters the reception and transmission rules give a transformation of the received reference at each hop of a path, and these rules, together with the structured reference data stored in each routing table enable a receiving master to identify whether a message is intended for a local member of its piconet or whether the message is intended for a node accessible by a linked master, with the master calculating a new routing indicator which is sent with the message.

Those skilled in the art will recognise that the routing tables must be updated throughout the network when a new piconet is linked to an existing network, and similarly if piconets or nodes leave the network.

Previously, an automatic configuration procedure was described in which direct links 40 were formed between piconets and compact routing tables 62,64 were configured to reflect these links. Furthermore, piconets refused requests to link to other known piconets so as to avoid loop or ring topologies. In the described example using FIG. 1, master node M3 issued a request to link with M1, M1 checked with other directly linked master nodes (M2) to determine whether M3 was known prior to the request. Since M2 responded in the affirmative the link request M3-M1 was denied to avoid a loop.

In another embodiment, the link request, although denied is recorded as a secondary link. As before, messages from M3 are routed to M1 via the direct link with M2. However, the quality of service across the links is monitored (average latency, number of dropped or unacknowledged packets/messages and so on). In the event that the link 40 between M3 and M2 becomes blocked or fails, or worsens due to extreme loading, then the previously recorded secondary link may be promoted to a direct link, the routing tables and routing indicators recalculated and messages subsequently routed using the promoted link as previously described. This enables the network to self-heal in certain situations such as when a direct link fails or is blocked for some reason. Furthermore, it may be the case that a direct link, although heavily loaded still functions and secondary links may then be utilised to help share the traffic load across a dense network comprising many piconets. An example of one way of achieving this will be described for the following embodiment.

In this embodiment, static references are defined per each node during initial configuration, with the reference increasing for each node that joins a piconet. For example, with reference to FIG. 1, piconet 10 may be assigned references 0, 1, 2 and 3, for M1, S11, S12 and S13 respectively. The second piconet 20, connected to piconet 10 via link 40 (M1-M2) is then allocated reference 4 with a count as shown in table 62 of M1. Piconet 20 however, begins its references in table 64 at 4 for M2, 5 for S21, 6 for S22 and so on. The reference for M1 in table 64 is supplied by M1 to M2 which records the entry as 0 in this case. Similarly, the references for piconet 30 would comprise references 7 through 9 for nodes M3, S31 and S32 respectively and 4 for M2.

In this embodiment the transmission and reception rules are simplified in that no transformation is necessary, i.e. the routing indicator is simply the reference number of the node in the network. Hence, for both transmission and reception rules RI=LR. The count in a table is still used to determine a target node to forward the message to as before. For example, the reference 5 is not stored in the table 62 but 5 lies between the reference for M2 which is 4 and a reference corresponding to M2 plus its count of accessible devices (4+6=10). Hence the count plus reference data still generally identify a target node for forwarding as before, whilst retaining compact routing tables.

This embodiment has the advantage that an efficient mechanism to determine when use of a secondary link is appropriate can be implemented. For example, each master/co-coordinator node exchanges certain information with secondary linked master nodes. This information comprises the senders own static RI/LR (ref(SRC ADDR) from the senders routing table) and the senders count number (including other nodes reachable via the sender's piconet using direct links). For example using FIG. 1, M3 transfers its LR of 7 and count number of 3 which in this case represents the number of local nodes on piconet 30. M1 may now decide to send a message intended for a target with reference in the range 7 to 9 directly to M3 using a previously recorded secondary link M1-M3. This reduces the number of hops by 1 in this example. The secondary links and count data may be stored by each master node in memory 56 as a secondary routing table which is checked together with the original direct link routing table in order to determine a target piconet and therefore which link to utilise. It will be appreciated that in dense complex networks comprising many piconets the use of secondary links and static references enables more efficient operation whilst still maintaining relatively compact routing tables.

In yet a further embodiment the network is enabled to reconfigure automatically when a change (a node joins or leaves a piconet for example) occurs. In such a background automatic configuration procedure (ACP), each piconet master/co-coordinator node (M1, M2, M3) has an alternative configuration table which is updated when a change occurs. A bit in the network PDU (NPDU) portion of a message 80 is toggled to indicate which configuration table a receiving co-ordinator should use to determine a target node for forwarding the message.

For example, a new node joining piconet 10 co-ordinated by master node M1 causes M1 to begin a communication process with directly linked neighbour master nodes. In the process, M1 calculates new local references relating to the change and stores these in the alternative configuration table. M1 then communicates the new local reference it has calculated for the neighbour (M2) to that neighbour. When M1 has finished building the alternative table it then employs this table as the routing table. Messages created using the new table are indicated as such by the NPDU bit in the message. That is, before a change the network had for example a default NPDU bit of 0. After the change M1 sends messages with an NPDU bit set to 1.

The neighbouring nodes (e.g. M2) similarly communicate with linked neighbouring nodes downstream of themselves (e.g. with M3) and build their alternative routing tables. Once constructed, M2 then signifies use of the new table by setting the NPDU bit to 1.

In this fashion, the change ripples through the network and over time all master nodes are updated. Note that messages created by nodes not updated signify this by the NPDU bit, and a node which has updated but still receives such a message simply reverts temporarily to the original configuration table in order to determine the appropriate routing. The network layer 76 (FIG. 3) comprises code describing timeout periods which define for how long the original tables are available for utilisation following an automatic configuration procedure. In example models, messages are assumed to have failed to reach their destination after 10s, but the original configuration tables remain valid for one minute to ensure that messages created many hops away from a target are still delivered correctly. Hence, such a background ACP enables a network to operate and reconfigure without substantial interruptions to service.

In another embodiment the optional linking means 58 comprises an optical infra-red transceiver with associated hardware for converting radio messages according to the invention to infra-red messages and receiving and transmitting these messages in infra-red form.

In yet another embodiment the linking means 58 comprise a serial data cable and associated plug and socket.

In yet a further embodiment the linking means 58 comprise using power supply lines as a message carrier to transmit messages between piconets. This implementation is well suited to embodiments of ZigBee radio piconets in the home where a set-top box has a radio device and is a master of devices primarily on one floor of the home, and perhaps a personal computer or TV is a master of devices primarily on another floor. Schemes known to those skilled in the art for relaying messages across power lines such as X10 or TC205 (Cenelec) may be employed.

The methods and procedures described above work generally with interconnected piconets provided that loops are avoided and that all of the master nodes are informed and update their routing tables accordingly whenever a node leaves a linked piconet, or a new node joins a linked piconet, or a piconet itself leaves the network. In general, the routing tables should be updated by each master removing or adding relevant entries for that piconet, and recalculating new references for piconets based on the count values.

In the above methods embodying an aspect of the present invention, a routing indicator in a message is transformed by a reception rule every time it is received by a master node and also transformed by a transmission rule every time it is transmitted to another linked master node. The methods and master devices implementing the above is particularly suited to, but not exclusively for, low power, low data rate radio networks incorporating for example, a ZigBee radio protocol. Such ZigBee radio devices are expected to have, at the time of writing, a limited memory and processing resources. Additionally, devices are typically uniquely identified by 8 byte identifiers, and messages over the air are limited to around 100 bytes for header and data information. Hence the use of ordered routing tables constructed as hereinbefore described, together with simple reception and transmission rules enables a message to be routed by a 2 byte routing indicator thereby freeing up limited message space and usefully improving radio bandwidth usage.

Furthermore, combinations of configuration procedures, including the tabling of secondary links enable the network to behave robustly and to some extent perform background reconfiguration without substantially halting operation.

From reading the present disclosure, other variations and modifications will be apparent to persons skilled in the art. Such variations and modifications may involve equivalent and other features which are already known in the art, and which may be used instead of or in addition to features already described herein.

The invention claimed is:

1. A method for routing a message in a radio network having a plurality of master/slave configured piconets, each piconet having a master node linked to, and operable to communicate with, the master node of another piconet and wherein each linked master node stores a routing table comprising local piconet entries identifying any slave nodes associated with its piconet and linked piconet entries identifying those piconets with which it is directly linked, the method comprising a master node of a piconet:

receiving a message from a linked master node, the message including a routing indicator, wherein the routing indicator identifies a target node for the message;

calculating a local reference from the routing indicator according to a reception rule based on a reference in the routing table identifying the linked master node that transmitted the message to the master node of the piconet;

identifying the target node according to the local reference and routing table information;

determining if the target node is a slave node associated with the local piconet or a node accessible via a linked piconet; and when the determined target node is identified as being a slave node associated with the local piconet transmitting the message to that slave node; and when the determined target node is identified as being a node accessible via a linked piconet, calculating a new routing indicator according to a transmission rule, replacing the routing indicator in the message with the new routing indicator and transmitting the message to the master node of the linked piconet.

2. The method according to claim 1, where each linked piconet entry comprises a reference associated with the address of a master node of that linked piconet and a count of the total number of nodes accessible via that master node, and where the local piconet entries each comprise a reference associated with the address of a slave node of the local piconet.

3. The method according to claim 2, where for each routing table the entries relating to the local piconet are arranged above those relating to linked piconets.

4. A radio network having a plurality of master/slave configured piconets each piconet having a master node linked to, and operable to communicate with, the master node of another piconet and wherein each linked master node has memory means for storing a reception rule, a transmission rule and a routing table comprising local piconet entries identifying any slave nodes associated with its piconet and linked piconet entries identifying those piconets with which it is directly linked, and wherein messages are routed within the network by the master nodes, each linked master node having:
    means for receiving a message from another linked master node, the message including a routing indicator, wherein the routing indicator identifies a target node for the message;
    processing means for calculating a local reference from the routing indicator in accordance with the stored reception rule based on a reference in the routing table identifying the linked master node that transmitted the message to the master node of the piconet and for identifying the target node according to the local reference and stored routing table entries, and for calculating a new routing indicator in accordance with the transmission rule and for replacing the routing indicator in the message with the new routing indicator if the target node is identified as being a node accessible via a linked piconet, and
    means for transmitting the message to the identified target node.

5. The radio network of claim 4, wherein communication between master nodes and slave nodes within a piconet is arranged according to a predefined short range radio protocol.

6. The radio network of claim 5, wherein the predefined short range radio protocol is that defined by the ZigBee Alliance.

7. The radio network of claim 4, wherein the master nodes are linked via wired means and wherein communication between such linked nodes is via said wired means.

8. The radio network of claim 4, wherein the master nodes are linked via wireless means and wherein communication between such linked nodes is via said wireless means.

9. The radio network of claim 8, wherein the wireless means comprises infrared transceivers, and wherein communication between such linked nodes is via said transceivers.

10. The radio network of claim 8, wherein the wireless means comprises radio transceivers, and wherein communication between such linked nodes is via said transceivers.

11. The radio network according to claim 10, wherein the radio communication between linked master nodes and the radio communication within those linked masters piconets are on different frequency channels.

12. A master node for use with a radio network having a plurality of master/slave configured piconets, the master node comprising:
    memory means for storing a reception rule, a transmission rule and a routing table comprising local piconet entries identifying any slave nodes associated with its piconet and linked piconet entries identifying those piconets with which it is directly linked;
    means for receiving a message from another linked master node, the message including a routing indicator, wherein the routing indicator identifies a target node for the message;
    processing means for calculating a local reference from the routing indicator in accordance with the stored reception rule based on a reference in the routing table identifying the linked master node that transmitted the message to the master node of the piconet and for identifying the target node according to the local reference and stored routing table entries, and for further calculating a new routing indicator in accordance with the transmission rule and for replacing the routing indicator in the message with the new routing indicator if the target node is identified as a linked piconet, and
    means for transmitting the message to the identified target node.

13. A method for routing a message in a radio network having a plurality of master/slave configured piconets, each piconet having a master node linked to, and operable to communicate with, the master node of another piconet, the method comprising acts of:
    storing only at linked master nodes, a routing table comprising local piconet entries identifying any slave nodes associated with its piconet and linked piconet entries identifying those piconets with which it is directly linked;
    receiving a message from a linked master node, the message including a routing indicator, wherein the routing indicator identifies a target node for the message;
    calculating a local reference from the routing indicator according to a reception rule based on a reference in the routing table identifying the linked master node that transmitted the message to the master node of the piconet;
    identifying the target node according to the local reference and routing table information;
    determining if the target node is a slave node associated with the local piconet or a node accessible via a linked piconet; and
    when the determined target node is identified as being a slave node associated with the local piconet transmitting the message to that slave node; and
    when the determined target node is identified as being a node accessible via a linked piconet, calculating a new routing indicator according to a transmission rule, replacing the routing indicator in the message with the new routing indicator and transmitting the message to the master node of the linked piconet.

\* \* \* \* \*